Dec. 31, 1940. J. E. HOLVECK ET AL 2,227,260
AUTOMATIC CONTROL FOR HIGH PRESSURE PUMPS
Filed Nov. 17, 1938 7 Sheets-Sheet 2

Joseph E. Holveck
Nelson E. Brigham
INVENTORS

BY *Ro....*
ATTORNEY

Dec. 31, 1940.    J. E. HOLVECK ET AL    2,227,260
AUTOMATIC CONTROL FOR HIGH PRESSURE PUMPS
Filed Nov. 17, 1938    7 Sheets-Sheet 4

Joseph E. Holveck
Nelson E. Brigham
INVENTORS

BY *Robt Meyer*
ATTORNEY

Fig. 8

Joseph E. Holveck
Nelson E. Brigham
INVENTORS

Dec. 31, 1940. J. E. HOLVECK ET AL 2,227,260
AUTOMATIC CONTROL FOR HIGH PRESSURE PUMPS
Filed Nov. 17, 1938 7 Sheets—Sheet 6

Joseph E. Holveck
Nelson E. Brigham
INVENTORS
BY
ATTORNEY

Dec. 31, 1940.  J. E. HOLVECK ET AL  2,227,260
AUTOMATIC CONTROL FOR HIGH PRESSURE PUMPS
Filed Nov. 17, 1938   7 Sheets-Sheet 7

Fig. 16
Fig. 15

Joseph E. Holveck
Nelson E. Brigham
INVENTORS
BY *Robt Meyer*
ATTORNEY

Patented Dec. 31, 1940

2,227,260

UNITED STATES PATENT OFFICE 2,227,260

AUTOMATIC CONTROL FOR HIGH PRESSURE PUMPS

Joseph E. Holveck, Crafton, Pa., and Nelson E. Brigham, Arlington, N. J., assignors to Worthington Pump & Machinery Corporation, Harrison, N. J., a corporation of Delaware Application November 17, 1938, Serial No. 240,910

24 Claims. (Cl. 103—40)

The present invention relates to a loading and unloading mechanism for positive displacement pumps, and an object of the present invention is to provide a simple, positive means for controlling a positive displacement or reciprocating pump of any type, such as duplex, double-acting, triplex, single and double acting, quintuplex, etc., either horizontal or vertical, and which will provide positive synchronization of all the cylinders of the pump in unloading and loading regardless of the point in pump revolution when the control functions.

Other objects of the present invention are to provide a loading and unloading mechanism as specified which will provide shockless unloading and loading of the pump; minimum loss of power when the pump is unloaded; no loss of pressure water when the pump is unloaded; one in which all mechanical parts are easily accessible from outside the pump; in which, if the electric current or operating pressure fluid fails, the pump will be unloaded, and since wear on the device and shocks to the equipment are eliminated, the pump may be loaded and unloaded with any degree of frequency.

In practically all pumping applications involving a pressure fluid for operating hydraulic machinery the demand for fluid power medium may have any of a number of flow conditions. The rate of flow may be uniform but not intermittent, in which case the demand for the hydraulic fluid is at a constant rate of flow in gallons per section for a short period of time, which is followed by a zero demand for another short period of time. It may have a variable rate of flow in which instance the demand for hydraulic fluid is continuous but at a varying rate of flow in gallons per second, or the rate of flow may be uniform, variable and intermittent. In this last instance the demand for hydraulic fluid may be a combination of the first two stated instances.

In all or any of the above conditions the pump control remains the same in that pump operation is intermittent. That is, the pump operates loaded to one hundred per cent capacity for a given time, and then at unloaded zero capacity for another given time. The relation between the length of loaded and unloaded time cycles depends upon the type of rate of flow, the fluid demand at a given time, and the capacity of the pump and the accumulator.

The present invention provides a synchronized loading and unloading mechanism capable of meeting any or all of the above demands where electric motor driven reciprocating pumps are employed and involves a control for such pumps which, when operating continuously and at a constant speed, a quick but gradual de-celerating fluid from full to zero flow in not more than one-half revolution of the pump (i. e. synchronized unloading) and a quick but gradual accelerating fluid delivery from zero to full flow in not more than one-half revolution of the pump (i. e. synchronized loading).

With these and other objects in view, as may appear from the accompanying specification, the invention consists of various features of construction and combination of parts, which will be first described in connection with the accompanying drawings, showing a pump loading and unloading mechanism embodying the invention, and the features forming the invention will be specifically pointed out in the claims.

Figure 1:
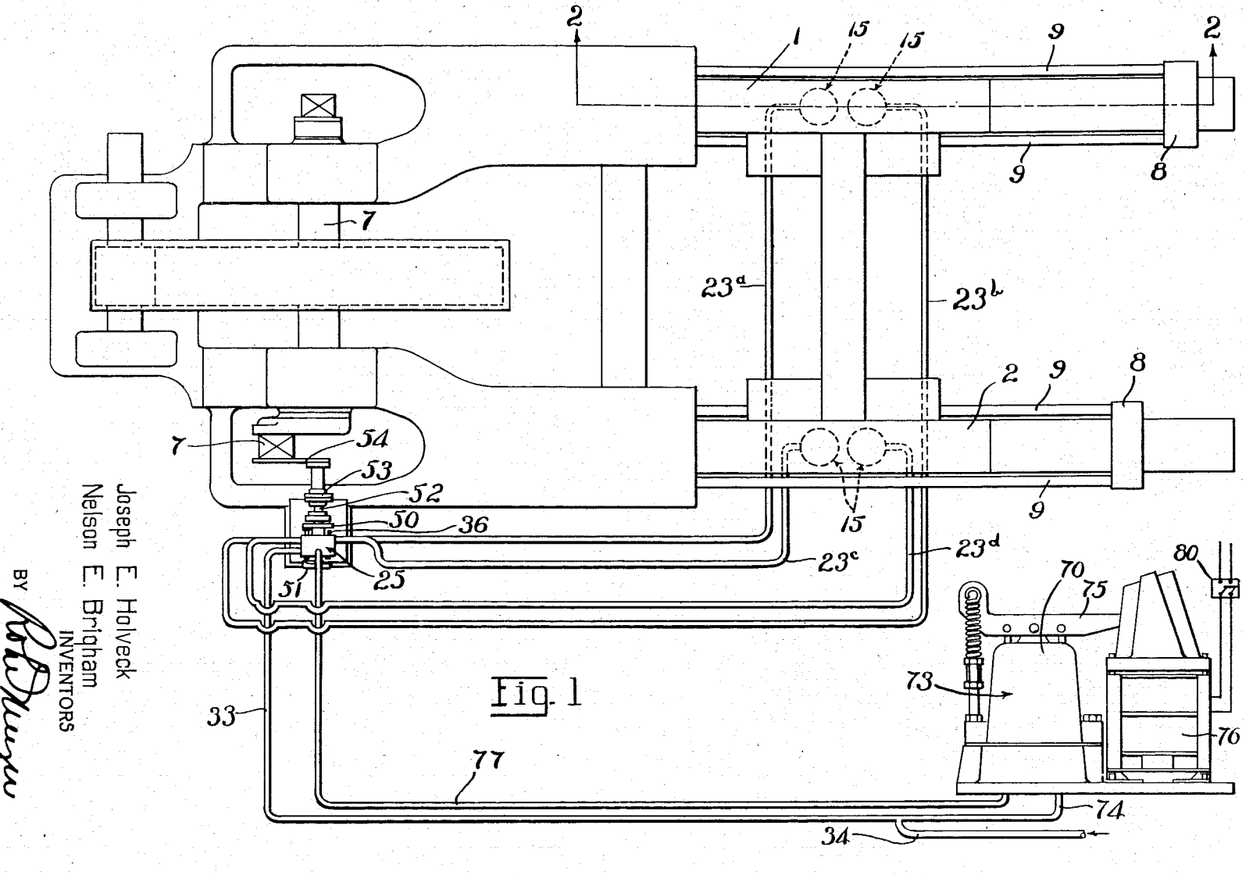
Figure 1 is a diagrammatic view in plan of the improved loading and unloading mechanism showing it associated with a pump.
Figure 2:
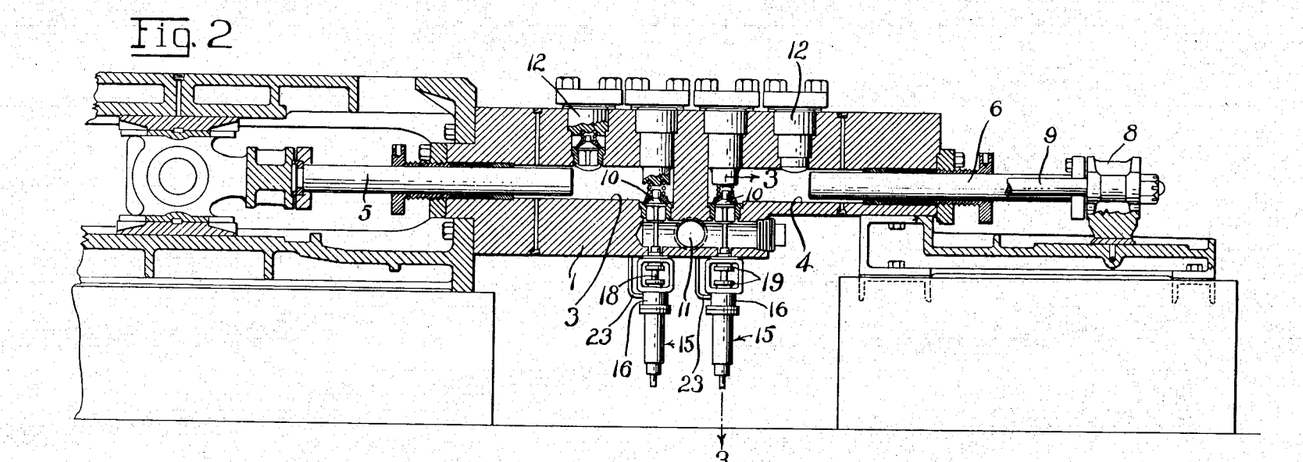
Figure 2 is a fragmentary longitudinal section through one of the pump cylinders showing the valve actuating mechanism associated therewith and taken on the line 2—2 of Figure 1.

Referring more particularly to the drawings, the improved pump unloading and loading mechanism is shown associated with a positive displacement pump of the reciprocating type comprising two cylinder blocks 1 and 2, each of which has a pair of opposed cylinders 3 and 4 therein. Reciprocating plungers or pistons 5 and 6 operate in the respective cylinders 3 and 4 and they are reciprocated by the rotation of a crank shaft 7. The outer pistons or plungers 6 are connected to the crank shaft 7 in the usual manner of opposed cylinder pumps of this type through the medium of cross-heads 8 and connecting rods 9. While the improved loading and unloading mechanism is shown in the drawings as applied to a pump of the type just described, it is to be understood that it is equally applicable to practically all types of positive displacement pumps, either vertical or horizontal, and with or without opposed cylinders, and that the particular type of pump is shown only for the purposes of illustrating the application of the loading and unloading mechanism.

Each of the pump cylinders 3 and 4 have suction valves 10 which control communication between the suction inlet or the intake 11 of the pump and the respective cylinders. The pump cylinders are also provided with approved type of discharge valves 12, as is ordinary in pump construction.

Figures 3, 4, 5:
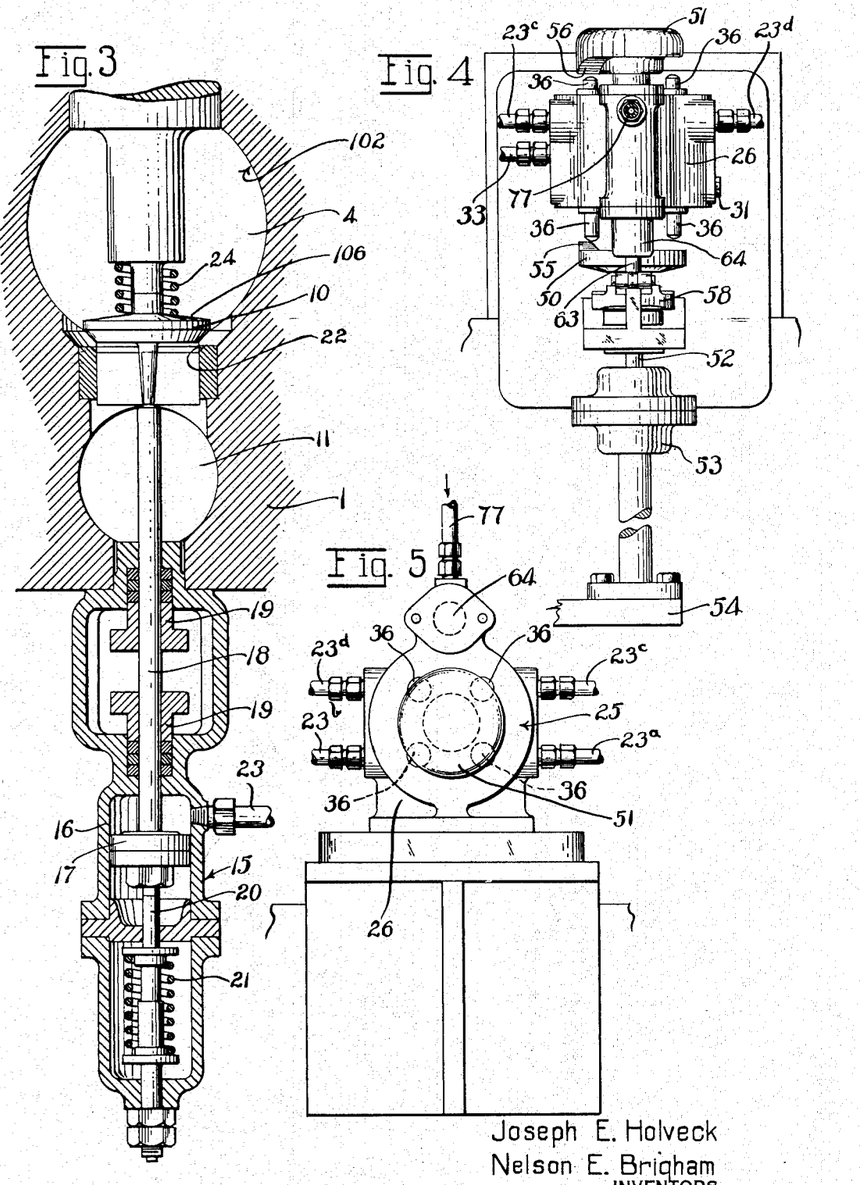
Figure 3 is a section through one of the valve actuating mechanisms showing it in connection with one of the suction valves of the pump and taken on the line 3—3 of Figure 2.
Figure 4 is a top plan of a distributing valve and its operating mechanism employed in the pump loading and unloading mechanism.
Figure 5 is an end view of the distributor valve.

The loading and unloading of the pump is provided through the medium of the suction valves 10; that is, when the pump is unloaded the suction valve 10 is held off its seat, as shown in Figure 3 of the drawings, which prevents the cutting off of the respective cylinder of the pump from the pump inlet or intake passage during the compression stroke of the piston or plunger, and consequently the liquid being acted upon by the pump is merely forced back and forth through the cylinder and intake chamber 11, and not through the discharge valves 12 in the usual manner when the pump is operating in a loaded condition.

The present invention comprises pressure actuated means for holding the suction valves off their seats to provide unloaded operation of the pump, and a longitudinal section through the pressure actuated valve holding means is shown in Figure 3 of the drawings.

The pressure actuated valve holding means generically designated at 15 each comprise a cylinder 16 in which is mounted a piston 17 for reciprocatory movement therein. A valve moving rod 18 is attached to the piston 17 and extends through suitable stuffing box structures 19 into the cylinder block 1 of the pump and engages the under or outer end of the suction valve 10. A rod 20 engages the piston 17 on the side opposite from the rod 18 and this rod is urged in valve operating position by a spring 21, so that in normal conditions or rather, at times when no pressure fluid is being delivered to the cylinder 16 the spring 21 will move the piston 17 and the rod 18 to force the suction valve 10 off its seat 22 and into open position where it will hold the valve causing the pump to operate unloaded. The cylinder 16 has an inlet supply line 23 for pressure fluid communicating therewith on the side of the piston opposite from the spring 21, so that when pressure fluid is delivered to the cylinder at a pressure in excess of the pressure against the piston 17 created by the spring 21 the piston 17 will be forced, against the tension of the spring 21, away from the suction valve 10, permitting the suction valve to be seated on its seat 22 and consequently permitting the pump to operate in a loaded condition. The pump will continue to operate in a loaded condition so long as there is pressure against the piston 17 sufficient to overcome the tension of the spring 21. It is understood, of course, that the tension of the spring 21 is sufficient to counteract the tension of the valve seating spring 24, which is the usual type of spring employed in positive displacement pumps for insuring the proper seating of the suction valve.

The delivery of pressure fluid to the cylinder 16 of the pressure actuated means or mechanism 15 is controlled by a distributing valve structure 25. In Figure 1 of the drawings, the pump illustrated is a four cylinder one, and consequently there are four of the pressure actuated mechanisms 25 associated therewith, one acting upon the suction valve of each of the cylinders. As a result, the distributor valve structure 25 is constructed to independently control the delivery of pressure fluid to the four structures 15. There are four pressure fluid supply lines 23, which are indicated in Figure 1 as 23a, 23b, 23c and 23d. When the improved loading and unloading mechanism is employed in connection with pumps having a different number of cylinders, the distributor valve structure 25 is naturally constructed to provide individual control for the pressure operating mechanism for the suction valve of each cylinder, regardless of the number of cylinders.

The distributor valve structure 25 comprehends a housing or body 26, which is divided longitudinally by suitable partitions 27 into an intake chamber 28, a delivery chamber 29 which has communicating therewith the pressure fluid supply pipes 23a, 23b, 23c and 23d, and an exhaust chamber 30, which opens out to atmosphere or any other suitable point through an exhaust outlet 31. Pressure fluid is delivered to the intake chamber 28 through a supply line 33, which has connection with any suitable source of pressure fluid through a supply pipe 34.

Figures 6, 7:
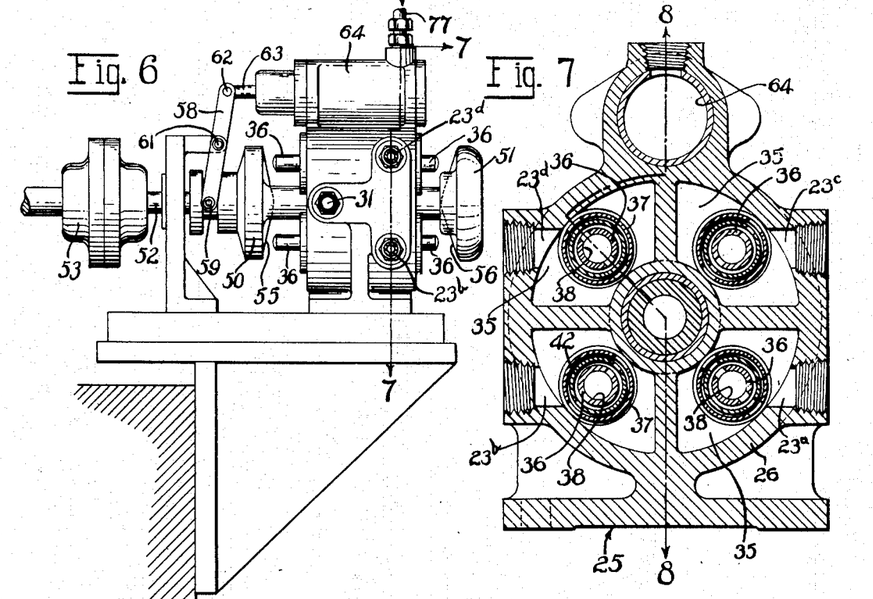
Figure 6 is a side elevation of the distributor valve.
Figure 7 is a vertical section through the distributor valve taken on the line 7—7 of Figure 6.

The housing 26 of the distributing valve 25 is partitioned radially into a number of compartments 35, corresponding to the number of cylinders in the pump with which the unloading and loading mechanism is associated, and consequently according to the number of pressure actuated devices 15 employed in the respective loading and unloading mechanism. As clearly shown in Figure 7 of the drawings, the housing 26 of the distributing valve structure illustrated is divided into four radial compartments 35, all of which have communication with the respective chambers 28, 29 and 30 through the medium of movable valve members 36, details of which are clearly shown in Figures 7 and 8 of the drawings.

The movable valve members 36 reciprocate in sleeves 37, and they are provided each with a longitudinally extending chamber 38. The movable valve members 36 are each provided with sets of radially extending ports 39 and 40 spaced longitudinally of the chamber 38, as clearly shown in Figure 8 of the drawings. The intake chamber 28 has communication through ports 41 in the sleeve 37 with the space between the ends of the stub sleeves 42 and 43 which separate the movable valve member 36 from the sleeve 37, while the delivery chamber 29 has communication with a part of the space between the facing ends of the stub sleeves 42 and 43 through radial ports 44 formed in the sleeve 37. The space between the ends of the stub sleeves 42 and 43 with which the ports 41 communicate is separated from the space with which the ports 44 communicate by means of a suitable fluid-tight packing or spacing ring 45. The exhaust chamber 30 communicates through ports 46 in the sleeve 37 and ports 47 in the stub sleeve 42 with an annular chamber 48 formed in the stub sleeve 42 and facing the movable valve member 36. Thus when the valve member 36 is moved into the position shown in Figure 8 of the drawings, the series of radial ports 40 will establish communication between the longitudinal chamber 38 and the valve member 36 and the exhaust chamber 30 in the valve housing 26, while the series of radial openings 39 will establish communication through the supply chamber 29 and the chamber 38 opening up the cylinders 16 to the supply chamber 29 through it to the chamber 38 and from the chamber 38 through the ports 40 to the exhaust chamber 30, thereby permitting the release of pressure fluid from the cylinders 16 and consequently permitting the valve 21 to move the pistons 17 and rods 18 to unseat the intake valves 10 and hold them unseated until such time as pressure fluid is again delivered to the cylinder 16.

Figure 8:
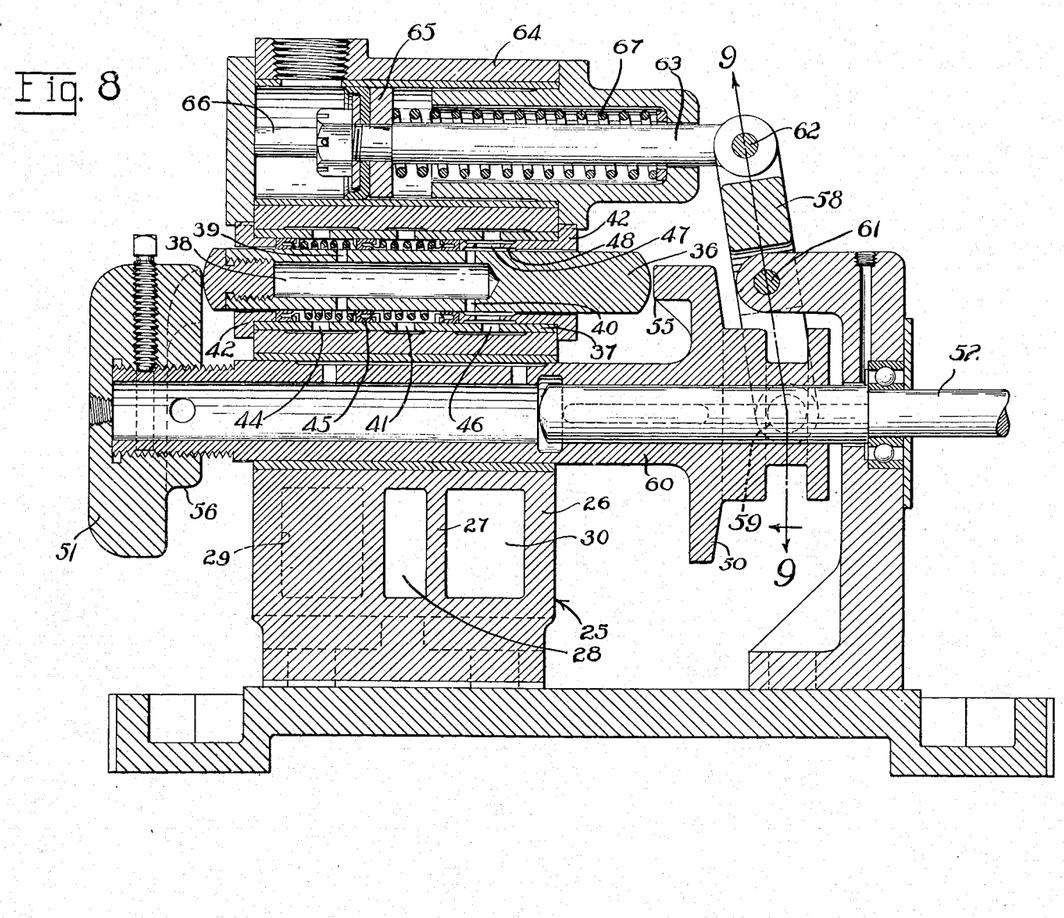
Figure 8 is an enlarged longitudinal section through the distributor valve taken on the line 8—8 of Figure 7.

When the movable valve element 36 is shifted to the left, in Fig. 8 of the drawings, it will move the ports 40 into communication with the ports 41 and open the intake chamber 28 to the chamber 38 in the valve element, permitting pressure fluid to flow into the chamber 38 through the supply line 33. The space within the sleeve 37 with which the ports 39 communicate is proportioned so that when the ports 40 are in communication with the ports 41, the ports 39 will still be open to the supply chamber 29, and thus the pressure fluid will flow through the movable valve element 36 and the respective supply line 23 controlled thereby to the respective cylinder 16 moving the piston 17 and the rod 18 out of valve holding position and permit the intake valve of the pump cylinder to operate in the normal pump loaded manner. The operation of all of the movable valve elements 36 is the same, and the respective radial compartments 36 form the delivery chamber 29, so that each movable valve element 36 controls the delivery of pressure fluid to, or the release of pressure fluid from, one of the cylinders 16, namely the respective one to which its chamber 36 is connected.

The valve elements 36 are shifted or moved longitudinally to provide the operations just above described by a loading cam 50 and an unloading cam 51. The cams 50 and 51 are mounted upon and rotate with a shaft 52 which is connected by a suitable coupling and crank arrangement 53 and 54 to the crank shaft 7, so that the loading and unloading cams 50 and 51 will be rotated in synchronism with the rotation of the crank shaft 7. The valve actuating offset faces 55 and 56 on the cams 50 and 51 respectively are constructed and arranged so that when they are in active operative position with respect to the movable valve members 36, each valve member will be operated in synchronism with the pump plungers of the cylinder with which the pressure actuated mechanism 15, the operation of which is controlled by the respective movable valve member 36, is connected.

Figure 9:
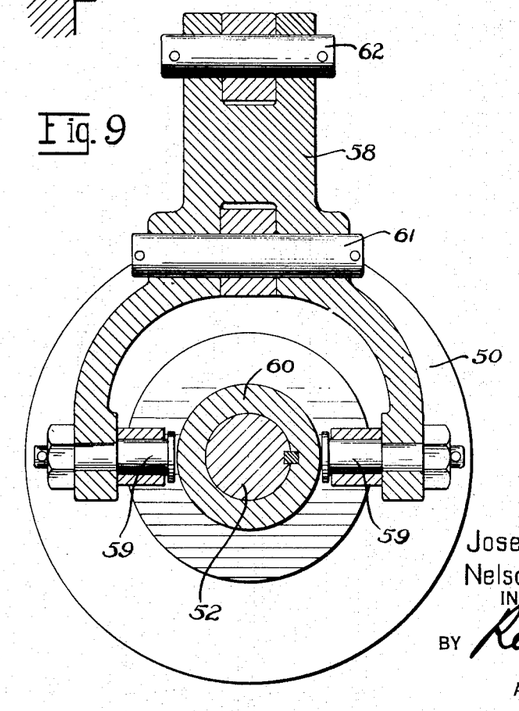
Figure 9 is a detail section through a part of the distributor valve taken on the line 9—9 of Figure 8.
Figure 10:
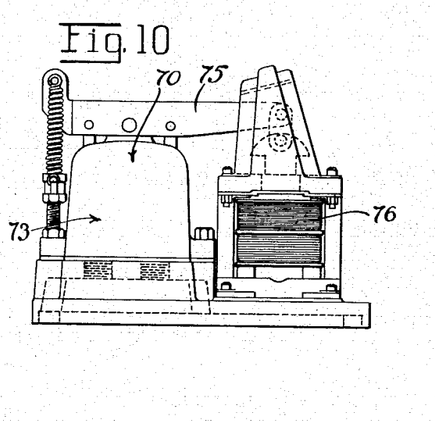
Figure 10 is a side elevation of an electrically actuated and controlled valve structure which controls the delivery of actuating pressure fluid to the distributing valve.
Figure 11:
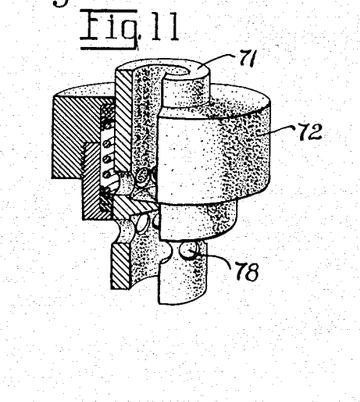
Figures 11 and 12 are detail views partly in section and partly in perspective of the valve mechanism of the electrically operated valve.
Figure 12:
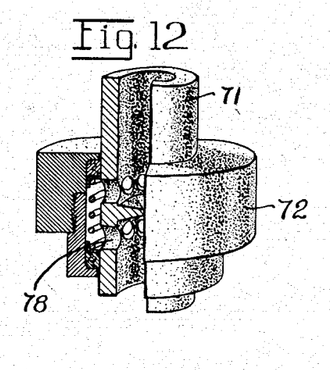

The cams 50 and 51 rotate constantly during the rotation of the crank shaft 7 and they are shifted longitudinally of the shaft 52 into or out of operative engagement with the movable valve elements 36 in accordance with conditions which call for either the loading or unloading of the pump. The cams 50 and 51 are shifted by a fork arm 58, the forks of which are connected in the usual manner as shown at 59 in Fig. 9 of the drawings, to the cam carrying sleeve 60, which is slidably mounted on the shaft 52 and keyed thereto for rotation therewith. The fork arm or lever 58 is pivotally connected intermediate its ends as shown at 61 and its end outwardly from the connections 59 is pivotally connected as shown at 62 to a rod 63. The rod 63 extends into the cylinder 64 on the housing 26 and forms a piston rod on which is mounted a piston 65. The piston 65 is moved into position against the stop 66 to shift the unloading cam 51 into position to operate the valve members 36 by a spring 67, while the piston 65, rod 63 and fork arm 58 are shifted by the action of pressure fluid to move the loading cam 50 into position for operating the movable valve elements 36 and moving the unloading cam 51 out of valve element operating position.

The delivery of pressure fluid to the cylinder 64 is controlled by an electrically operated structure 70, which is shown in Figures 1, 10, 11 and 12. This mechanism is a solenoid actuated valve which may be purchased upon the open market, and while one particular type of such valve is shown in the drawings, it is to be understood that any approved type of electrically operated valve which will perform the function required may be substituted for the one shown. However, to carry out the cycle of operation of the loading and unloading mechanism the operation of the particular type of valve shown will be described. The valve structure 70 comprises a shiftable valve sleeve 71 which is shiftable within a stationary sleeve 72, both of which are enclosed in a suitable housing 73. The valve sleeve 71 is moved longitudinally by means of a lever 75 which is in turn actuated by a solenoid 76, so that when the solenoid 76 is energized, pressure fluid entering the valve structure 70 through the supply line 74 will flow through the valve sleeve 72 and 71 and outwardly through the supply line 77 into the cylinder 64 for moving the piston 65 against the tension of the spring 67 to actuate the fork arm 58 to move the loading cam 50 into operative position relative to the movable valve members 36. When the solenoid 76 is de-energized, it will, through the lever 75, move the valve sleeve 71 to cut off the delivery of pressure fluid through the supply line 77 to the cylinder 64 and open the cylinder 64 to exhaust through the lower series of ports 78, permitting the pressure fluid to bleed from the cylinder 64 and allowing the spring 67 to move the piston 65 thus moving the unloading cam 51 into position to operate the movable valve elements 36.

Thus, at any time, the master control switch 80 is closed and the solenoid 76 is energized, the pump will operate in loaded condition, excepting only in such instances as when the supply of pressure fluid to the distributing valve 25 fails. Whenever the switch 80 is open or the supply of pressure fluid fails, the pump will operate in unloaded position through the action of the springs 67 and 21.

Through the connection of the shaft 52 with the crank shaft 7, and the arrangement of the operating surfaces on the cams 50 and 51 as above described, it will be apparent that the various pump cylinders will be loaded and unloaded in synchronism with the operation of the pistons or plungers therein, and these various elements are so arranged that the various cylinders will be loaded or unloaded during the suction stroke of each plunger or piston, and at the proper time and in not more than one-half revolution of the pump, thereby relieving the various parts of the mechanism and pump of shocks. In this way the pump may be unloaded and loaded with any degree of frequency. Since during the unloading cycle the pump operates only on suction pressure and no work is being done by the pump, the power required for such operation need only be sufficient to overcome the mechanical friction of the pump, resulting in a material power savings at such times. With the present synchronized loading and unloading mechanism, the pump will be operating so that at any time required its full load may be provided when needed on practically an instant demand.

Figure 13:
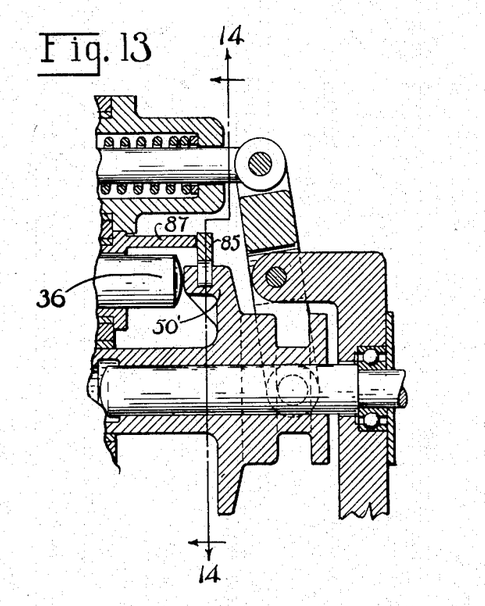
Figure 13 is a fragmentary longitudinal section of a modified form of the distributor valve.
Figure 14:
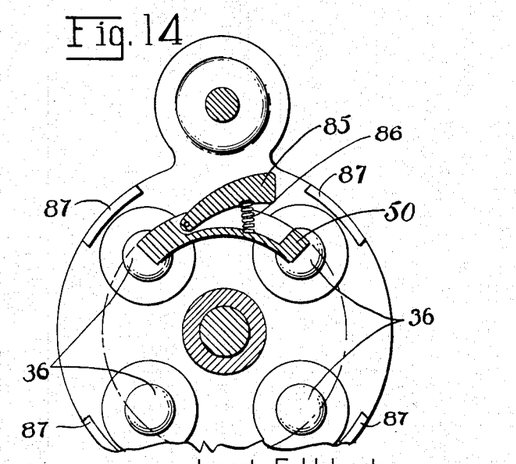
Figure 14 is a cross-section through the modified form of distributor valve taken on the line 14—14 of Figure 13.

In Figures 13 and 14 a slight modification of the distributor valve structure is shown.

In Figures 13 and 14 the loading cam 50' has a stop pawl 85 pivotally carried thereby and urged outwardly beyond the perimeter of the cam 50' by a spring 86.

The pawl 85 cooperates with stops 87 formed on the housing 26 or cylinder 64, as may be found desirable, for limiting the movement of the loading cam 50' into position for moving the valve elements 36 during its rotation.

The pawl 85 is positioned with respect to the valve element actuating surface 55 of the cam 50 so that if the piston 65 is operated to move the cam 50 longitudinally into valve element operating position at a time when the space 55 is not in the proper location to provide absolute synchronization between the operation of the valve member 36 and the piston of the pump, the pawl will, being urged outwardly by the spring 86, contact the stop member 87, as shown in Figure 13 of the drawings, holding the loading cam 50 against further movement until it has rotated sufficient distance for the pawl 85 to clear the stop 87, at which time the cam will be moved further towards the valve elements for operating them in the proper sequence. The spring 67 being a yieldable element will provide a compensator between the movement of the piston 65 and the cam 50 during such time as the pawl 85 is in contact with any one of the stop members 87.

In the preferred form of the invention shown in Figures 1 to 12 inclusive, the pressure actuated members comprising the piston 17 and rod 18 are, as previously stated, held in valve holding position to unload the pump by the spring 21, and are moved out of valve holding position to load the pump by pressure fluid delivered to the end of the cylinder 16 opposite the end at which the spring 21 is located, so that the piston 17 and member 18 are held out of valve loading position by pressure at all times when the pump is operating. In the modified construction shown in Figures 15 to 17 inclusive a different cycle of operation is provided, the principal difference being that the pressure actuated valve holding member is held out of intake valve holding position by pressure which is constantly supplied to the pressure actuated member, and it is moved into valve holding position to provide unloaded operation of the pump by pressure fluid delivered to the pressure actuated member through the distributing valve. In other words, the distributing valve controls the delivery of pressure fluid to the pressure actuated member to unload the pump, in contradistinction to the fact that it delivers pressure fluid to the pressure actuated member to load the pump, in the preferred form of the invention.

Figures 15, 16:
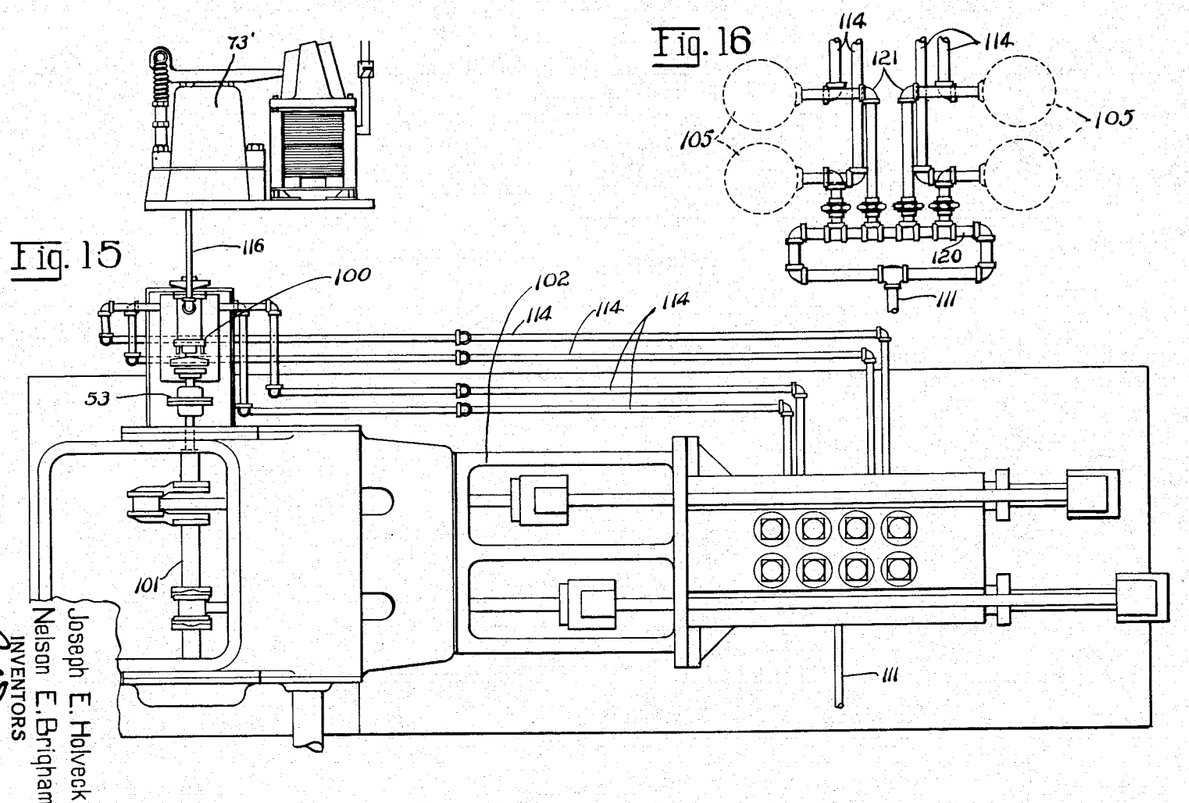
Figure 15 is a plan view of a modified form of the pump unloading mechanism.
Figure 16 is a detail plan of the piping arrangement associated with the pressure actuated valve moving members.

In this modified form of the invention a distributor valve, which is generically indicated at 100 in Figure 15, is employed, and this distributor valve is identical in its construction and method of operation with the distributor valve structure 25, consequently it is not illustrated in detail, and in describing the operation of the distributor valve in connection with the modified form of unloading and loading mechanism, reference will be made to Figure 8 of the drawings, showing the section of the distributor, and its operation will be described in conjunction with said figure.

The distributor valve 100 includes the loading and unloading cams 50 and 51, which are constantly rotated from the crank shaft 101 of the pump structure 102, in the same manner as illustrated in Figure 1 of the drawings. The cams 50 and 51 are moved into and out of valve member actuating positions by means of the piston 65, rod 63 and forked lever 58, in exactly the same manner as heretofore described. The delivery of pressure fluid to the inlet chamber 28 of the distributor valve is controlled by an electrically operated mechanism, the same as in the preferred form; that is, by a solenoid actuated valve structure 73', which is identical with the solenoid actuated valve 73 clearly shown in Figures 10 to 12 of the drawings.

The principal difference in the modified form over the preferred form lies in the construction of the pressure actuated member and its connections with the distributor valve.

Figure 17:
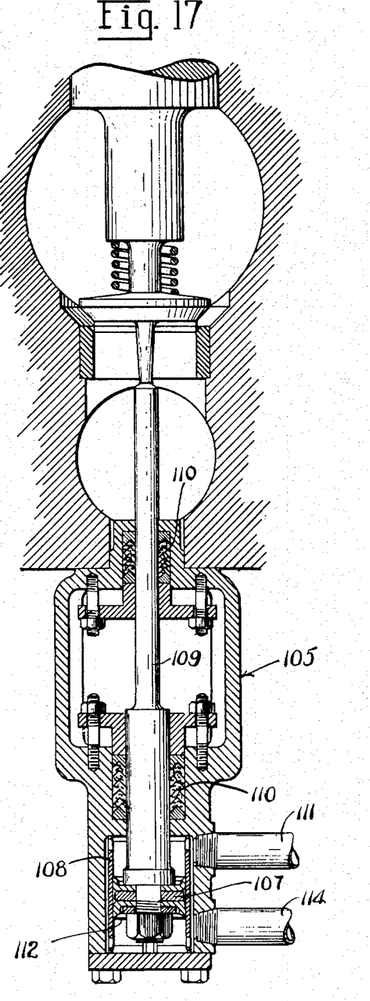
Figure 17 is a longitudinal section through a modified form of the pressure actuated valve holding means.

Referring more particularly to Figure 17 of the drawings, the pressure actuated mechanism 105, one of which is associated with each of the suction valves 106 of the pump structure 102, comprises a differential piston structure 107 which reciprocates in a cylinder 108 and has a rod 109 attached thereto which engages the valve 106 at certain times to hold the valve off its seat to provide unloaded operation of the pump structure 102. Suitable stuffing boxes 110 are provided about the rod 109.

By particular reference to Figure 17 of the drawings, it will be noted that the end of the rod 109 which engages the piston 107 is very materially increased in diameter, providing differential areas at opposite ends of the piston 107, by reducing the area of the piston acted upon by pressure fluid at the end of the piston which faces towards the pump over the area of the other end of the piston.

A pressure fluid supply line 111 is connected to and opens into the end of the cylinder 108 facing the smaller active area end of the piston. This supply line 111 provides a constant supply of pressure fluid to the cylinder 108 and against the smaller active area end of the piston 107, so that when the larger active area end 112 of the piston is free from action of pressure fluid the piston 107 will be forced outwardly, moving the rod 109 out of engagement with the suction valve 106 and consequently the suction valve will be permitted to operate in its normal manner and with the pump loaded.

However, the pump operates in an unloaded condition when pressure fluid is delivered to the cylinder 108 through the delivery pipe 114 and against the area or end 112 of the piston 107. The pressure fluid delivered to the cylinder 108 through the pipe 114 is from the same source and under the same pressure as the pressure fluid delivered to the cylinder through the supply line 111, but due to the differences in the active areas of the opposite ends of the piston the pressure fluid delivered to the cylinder through the pipe 114 will force inwardly against the pressure in the inner end of the piston, forcing the pressure fluid from the inner end of the piston back into the supply line and will move the rod 109 into engagement with the intake valve 106 and force the intake valve 106 off its seat permitting the pump to operate in an unloaded condition.

As shown in Figure 15 of the drawings, the modified form of the pump loading and unloading mechanism is associated with a double-acting four cylinder pump, consequently there are four unloading valves and four of the pressure actuated mechanisms 105, one being associated with each suction or intake valve mechanism of each pump cylinder. As a consequence the distributor valve mechanism 100 which controls the delivery of the pressure fluid through the supply pipe 114 to the pressure actuated member 105 will be identical with that shown in Figure 8 of the drawings. Its controlling action, however, will be slightly different, due to the difference in construction of the pressure actuated members and of the supply or delivery of pressure fluid thereto.

If, during the time that the pump 102 is operating in normal or loaded condition, occasion arises when the pump is to be operated in unloaded condition the electrically operated valve structure 73' will be actuated to admit pressure fluid through the pipe 116 to the cylinder 64 and will move the piston 65 against the spring 67. This movement of the piston 65 will move the cam 50 into operating position with respect to the movable valve member 36 so that at the proper synchronized moment the valve member 36 will be moved to connect the supply chamber 28 through the movable valve element 36 with the chamber 29, to which chamber the pipe 114 is connected. The chamber 28 is connected to the pressure fluid supply line through the inlet 33, so that fluid under pressure will flow through the distributor valve 25 through the supply pipe 114 into the cylinder 108 against the face or end 112 of the piston and operate this piston and the rod 109 to move the suction valve off its seat.

When the pump is operating in loaded condition the electrically operated mechanism or valve 73' is operated to cut off the delivery of pressure fluid to the cylinder 64 and the piston 65 will then be moved by the spring 67, which will in turn move the cam 51 into valve member operating position. At the proper time during the rotation of the cam 51 it will move the valve element 36 to connect the chamber 29 through the valve element 36 with the exhaust chamber 30 and consequently to atmosphere through the exhaust port 31 and permit the pressure fluid to exhaust out of the cylinder 108 from behind the piston, reducing the pressure in the cylinder behind the piston below the pressure in the cylinder ahead of the piston, and thus the piston 107 and the rod 109 will be moved out of intake valve holding position and the pump will operate in loaded condition.

Figure 16 is merely a plan view of the piping arrangement, illustrating the manner of connecting the various pressure actuated members 105 to the supply line 111 and to the distributor valve structure 100 through the respective pipes 114. This view shows a header length of pipe 120 which is directly connected to the supply pipe 111 and has a plurality of branches 121 going to each of the pressure operated members 105, while the pipes 114 are individually connected to the members 105 and to the distributor valve, so that the movable valve members 36 of the distributor valve will individually control the delivery of pressure fluid to the respective pressure actuated elements on the bleeding of the pressure fluid therefrom in the manner heretofore described.

It will be understood that the invention is not to be limited to the specific construction or arrangement of parts shown but that they may be widely modified within the invention defined by the claims.

What is claimed it:

1. In a pump loading and unloading mechanism the combination with a pump including a cylinder and a reciprocating piston therein, of a valve for controlling the loading and unloading of the cylinder, a pressure actuated member for operating said valve, electrically operated means controlling delivery of pressure fluid to said pressure actuated member, a distributor valve interposed between said pressure actuated member and said electrically operated means, and means connecting said distributor valve to said piston for synchronized operation therewith for timing the valve operating operation of said pressure actuated member.

2. In a pump loading and unloading mechanism the combination with a pump including a cylinder and a piston therein, and an intake valve for said cylinder, of a pressure actuated member normally holding said intake valve in cylinder unloading position and operated by pressure fluid to permit seating of said intake valve to load said pump, electrically operated means controlling delivery of pressure fluid to said pressure actuated member, and a distributor valve interposed between said pressure actuated member and said electrically operated means for controlling delivery of pressure fluid to said pressure actuated member, and means connecting said distributor valve to said piston for synchronized operation therewith for timing the valve operating operation of said pressure actuated member.

3. In a pump loading and unloading mechanism the combination with a pump including a cylinder and a piston therein, and an intake valve for said cylinder, of a pressure actuated member normally holding said intake valve in cylinder unloading position and operated by pressure fluid to permit seating of said suction valve to load said pump, electrically operated means controlling delivery of pressure fluid to said pressure actuated member, means for moving said pressure actuated member into intake valve unseating position upon the release of pressure fluid from said pressure actuated means, a distributor valve interposed between said pressure actuated member and said electrically operated means for controlling the delivery of pressure fluid to and the release of pressure fluid from said pressure actuated member, and means connecting said distributor valve to said piston for synchronized operation therewith for timing the valve operating operation of said pressure actuated member.

4. In a loading and unloading mechanism for pumps, the combination with a pump including cylinders, pistons therein, and intake valves for said cylinders, of pressure actuated means for holding said intake valves open to unload the pump and movable out of valve holding position to permit loading of the pump, a pressure fluid distributing valve controlling distribution of actuating pressure fluid to said pressure actuated means, electrically operated means controlling operation of said distributing valve, said distributing valve embodying actuating means, a crank shaft for operating said pump pistons, said distributing valve actuating means connected to said crank shaft for operation therewith whereby the intake valves will be actuated to load or unload the pump in sequence synchronism with the operation of said pistons.

5. In a loading and unloading mechanism for pumps, the combination with a pump including cylinders, pistons in said cylinders and intake valves for said cylinders, of pressure actuated means for holding said intake valves open to unload the pump and moved out of valve holding position upon delivery of pressure fluid thereto, a pressure fluid distributing valve controlling distribution of actuating pressure fluid to said pressure actuated means, electrically operated means controlling operation of said distributing valve, said distributing valve embodying actuating means operable in synchronism with said pistons whereby the intake valves will be actuated to load or unload the pump in sequence synchronism with the operation of said pistons, said distributing valve acting to permit release of actuating pressure fluid from said pressure operated means, and means for moving said pressure operated means into intake valve holding position upon the bleeding of pressure fluid therefrom.

6. In a loading and unloading mechanism for pumps, the combination with a pump including cylinders, pistons therein, a crank shaft for operating said pistons, and intake valves for said cylinders, of pressure actuated means for holding said intake valves open to unload the pump and movable out of valve holding position to permit loading of the pump, a pressure fluid distributing valve controlling distribution of actuating pressure fluid to said pressure actuated means, said distributor valve including a movable valve member for each of said intake valve moving means, loading and unloading cams for actuating said movable valve members, means connecting said cams to said crank shaft whereby the intake valve moving means will be operated in synchronism with the operation of said pistons, pressure actuated means for moving said loading and unloading cams into and out of operative position relative to said movable valve members, and stop means associated with one of said cams for arresting its movement into valve operating position at predetermined times.

7. In a loading and unloading mechanism for pumps, the combination with a pump including cylinders, pistons therein, a crank shaft for actuating said pistons, and intake valves for said cylinders, of means for moving said intake valves into cylinder unloading position, a distributor valve for delivering pressure fluid to said valve moving means for moving the means out of intake valve holding positions to allow loading of the pump, a master switch, electrically operated means controlled by said switch and controlling operation of said distributor valve whereby when said electrically operated means is energized pressure fluid will be delivered to said moving means and bled therefrom upon de-energizing of said electrically operated means, and means operatively connecting said distributor valve to said crank shaft whereby the distributor valve will be operated in synchronism with the operation of said pistons.

8. In a loading and unloading mechanism for pumps, the combination with a pump including cylinders, pistons therein, a crank shaft for actuating said pistons, and intake valves for said cylinders, of means for moving said intake valves into cylinder unloading position, a distributor valve for delivering pressure fluid to said valve moving means for moving the means out of intake valve holding positions to allow loading of the pump, a master switch, electrically operated means controlled by said switch and controlling operation of said distributor valve whereby when said electrically operated means is energized pressure fluid will be delivered to said moving means and bled therefrom upon de-energizing of said electrically operated means, said distributor valve including a movable valve member for each of said intake valve moving means, loading and unloading cams for actuating said valve members, means connecting said cams to said crank shaft whereby the intake valve moving means will be operated in synchronism with the operation of said pistons.

9. In a loading and unloading mechanism for pumps, the combination with a pump including cylinders, pistons therein, a crank shaft for operating said pistons, and intake valves for said cylinders, of pressure actuated means for holding said intake valves open to unload the pump and moved out of valve holding position upon delivery of pressure fluid thereto, a pressure fluid distributing valve controlling distribution of actuating pressure fluid to said pressure actuated means, said distributor valve including a movable valve member for each of said intake valve moving means, loading and unloading cams for actuating said movable valve members, means connecting said cams to said crank shaft whereby the intake valve moving means will be operated in synchronism with the operation of said pistons.

10. In a loading and unloading mechanism for pumps, the combination with a pump including cylinders, pistons therein, a crank shaft for operating said pistons, and intake valves for said cylinders, of pressure actuated means for holding said intake valves open to unload the pump and movable out of valve holding position to permit loading of the pump, a pressure fluid distributing valve controlling distribution of actuating pressure fluid to said pressure actuated means, said distributor valve including a movable valve member for each of said intake valve moving means, loading and unloading cams for actuating said movable valve members, means connecting said cams to said crank shaft whereby the intake valve moving means will be operated in synchronism with the operation of said pistons, pressure actuated means for moving said loading and unloading cams into and out of operative position relative to said movable valve members, and electrically operated means controlling delivery of pressure fluid to said cam moving pressure operated means.

11. In a loading and unloading mechanism for pumps, the combination with a pump including cylinders, pistons therein, a crank shaft for actuating said pistons, and valves for unloading said cylinders, of means for holding said unloading valves in cylinder unloading positions, a distributor valve for delivering pressure fluid to said unloading valve holding means to move them out of valve holding positions to permit loaded operation of the pump, said distributor valve including a movable valve member for each of said unloading valve holding means, loading and unloading cams for actuating said valve member, and means for moving said cams into and out of operating position relative to said movable valve members.

12. In a loading and unloading mechanism for pumps, the combination with a pump including cylinders, pistons therein, a crank shaft for actuating said pistons, and valves for unloading said cylinders, of means for holding said unloading valves in cylinder unloading positions, a distributor valve for delivering pressure fluid to said unloading valve holding means to move them out of valve holding positions to permit loaded operation of the pump, said distributor valve including a movable valve member for each of said unloading valve holding means, loading and unloading cams for actuating said valve member, means for moving said cams into and out of operating position relative to said movable valve members, and means connecting said cams to said crank shaft whereby said valve members and said unloading valve holding means will be actuated in synchronism with said pistons.

13. In a loading and unloading mechanism for pumps, the combination with a pump including cylinders, pistons therein, a crank shaft for actuating said pistons, and valves for unloading said cylinders, of means for holding said unloading valves in cylinder unloading positions, a distributor valve for delivering pressure fluid to said unloading valve holding means to move them out of valve holding positions to permit loaded operation of the pump, said distributor valve including a movable valve member for each of said unloading valve holding means, loading and unloading cams for actuating said valve member, means for moving said cams into and out of operating position relative to said movable valve members, means connecting said cams to said crank shaft whereby said valve members and said unloading valve holding means will be actuated in synchronism with said pistons, and electrically operated means controlling operation of said cam moving means.

14. In a loading and unloading mechanism for pumps, the combination with a pump including cylinders, pistons therein, a crank shaft for actuating said pistons, and valves for unloading said cylinders, of means for holding said unloading valves in cylinder unloading positions, a distributor valve for delivering pressure fluid to said unloading valve holding means to move them out of valve holding positions to permit loaded operation of the pump, said distributor valve including a movable valve member for each of said unloading valve holding means, loading and unloading cams for actuating said valve member, a pressure operated piston operable upon delivery of pressure fluid thereagainst to move said loading cam into valve member actuating position to actuate the valve member to deliver pressure fluid to said unloading valve holding means and operable upon release of pressure fluid therefrom to move said unloading cam into valve member actuating position to allow bleeding of pressure fluid from said unloading valve holding means, and means connecting said loading and unloading cams to said crank shaft for rotating the cams by rotation of the crank shaft.

15. In a loading and unloading mechanism for pumps, the combination with a pump including cylinders, pistons therein, a crank shaft for actuating said pistons, and valves for unloading said cylinders, of means for holding said unloading valves in cylinder unloading positions, a distributor valve for delivering pressure fluid to said unloading valve holding means to move them out of valve holding positions to permit loaded operation of the pump, said distributor valve including a movable valve member for each of said unloading valve holding means, loading and unloading cams for actuating said valve member, means for moving said cams into and out of operating position relative to said movable valve members, and stop means associated with said loading cam for arresting movement thereof into valve operating position at predetermined times.

16. In a pump loading and unloading mechanism, the combination with a pump including a cylinder and a reciprocating piston therein, and a valve for controlling the loading and unloading of the cylinder, of a pressure actuated member for operating said valve, electrically operated means controlling delivery of pressure fluid to said pressure actuated member, a distributor valve interposed between said pressure actuated member and said electrically operated means, means connecting said distributor valve to said piston for synchronized operation therewith for timing the valve operating operation of said pressure actuated member, said pressure actuated member including a cylinder, a differential piston in said cylinder, a pressure fluid supply line connected to said cylinder for maintaining pressure against the smaller area end of said differential piston to move the pressure actuated member into position to permit loaded operation of said pump, said distributor valve controlling delivery of pressure fluid to said cylinder against the larger area end of the differential piston to move the pressure actuated member into valve engaging position to provide unloaded operation of the pump.

17. In a loading and unloading mechanism for pumps, the combination with a pump including cylinders, pistons therein, a crank shaft for actuating said pistons, and intake valves for said cylinders, of pressure actuated means associated with each intake valve and normally subjected to pressure to hold it out of intake valve actuating position to permit loaded operation of the pump, a distributor valve for delivering pressure fluid to said pressure actuated means to move them into intake valve holding position to provide unloaded operation of the pump, electrically operated means for controlling operation of said distributor valve, and means connecting said distributor valve to said crank shaft for synchronized operation therewith for timing the distribution of pressure fluid to said pressure actuated means and the bleeding of pressure fluid therefrom.

18. In a loading and unloading mechanism for pumps, the combination with a pump including cylinders, pistons therein, a crank shaft for actuating said pistons, and intake valves for said cylinders, of pressure actuated means associated with each intake valve and normally subjected to pressure to hold it out of intake valve actuating position to permit loaded operation of the pump, a distributor valve for delivering pressure fluid to said pressure actuated means to move them into intake valve holding position to provide unloaded operation of the pump, said distributor valve including movable valve members controlling delivery of pressure fluid to and bleeding of pressure fluid from said pressure actuated means, means for actuating said movable valve members, and means connecting said actuating means and said pump pistons for actuating the movable valve members in synchronism with the pistons.

19. In a loading and unloading mechanism for pumps, the combination with a pump including a cylinder, a piston therein, a crank shaft for actuating said piston, and an intake valve for said cylinder, of pressure actuated means acting on said intake valve for controlling loading and unloading of the pump, a pressure fluid distributing valve controlling distribution of actuating pressure fluid to said pressure actuated means, electrically operated means controlling operation of said distributing valve, said distributing valve embodying actuating means, a crank shaft for operating said pistons, said distributing valve actuating means connected to said crank shaft for operation therewith whereby the intake valves will be actuated to load or unload the pump in sequence synchronism with the operation of said piston.

20. In a loading and unloading mechanism for pumps, the combination with a pump including a cylinder, a piston therein, a crank shaft for actuating said piston, and an intake valve for said cylinder, of pressure actuated means acting on said intake valve for controlling loading and unloading of the pump, a pressure fluid distributig valve controlling distribution of actuating pressure fluid to said pressure actuated means, said distributor valve including a movable valve member for each of said intake valve moving means, loading and unloading cams for actuating said movable members, and means connecting said cams to said crank shaft whereby the intake valve moving means will be operated in synchronism with the operation of said piston.

21. In a loading and unloading mechanism for pumps, the combination with a pump including a cylinder, a piston therein, a crank shaft for actuating said piston, and an intake valve for said cylinder, of pressure actuated means acting on said intake valve for controlling loading and unloading of the pump, a pressure fluid distributing valve controlling distribution of actuating pressure fluid to said pressure actuated means, said distributor valve including a movable valve member for each of said intake valve moving means, loading and unloading cams for actuating said movable members, means connecting said cams to said crank shaft whereby the intake valve moving means will be operated in synchronism with the operation of said piston, and pressure actuated means for moving said cams into and out of operative relation with said valve members.

22. In a loading and unloading mechanism for pumps, the combination with a pump including a cylinder, a piston therein, a crank shaft for actuating said piston, and an intake valve for said cylinder, of pressure actuated means acting on said intake valve for controlling the loading and unloading of the pump, a valve member for controlling the delivery of actuating pressure fluid to said pressure actuated means, a cam for operating said valve member, means connecting said cam to said crank shaft whereby the cam will continuously rotate during rotation of the crank shaft, means normally holding said cam out of valve member actuating position, and means for moving said cam into valve member operating position.

23. In a loading and unloading mechanism for pumps, the combination with a pump including a cylinder, a piston therein, a crank shaft for actuating said piston, and an intake valve for said cylinder, of pressure actuated means acting on said intake valve for controlling loading and unloading of the pump, a distributor valve including a movable valve member for controlling the delivery of actuating pressure fluid to said pressure actuated means, loading and unloading cams for actuating said valve member, means connecting said cams to said crank shaft whereby said cams will rotate continuously during rotation of the crank shaft, and means for moving said cams into and out of operating position relative to said movable valve member.

24. In a loading and unloading mechanism for pumps, the combination with a pump including a cylinder, a piston therein, a crank shaft for actuating said piston, and an intake valve for said cylinder, of pressure actuated means acting on said intake valve for controlling loading and unloading of the pump, a distributor valve including a movable valve member for controlling the delivery of actuating pressure fluid to said pressure actuated means, loading and unloading cams for actuating said valve member, means connecting said cams to said crank shaft whereby said cams will rotate continuously during rotation of the crank shaft, means for moving said cams into and out of operating position relative to said movable valve member, and stop means associated with one of said cams for arresting movement thereof into valve member operating position at predetermined times.

JOSEPH E. HOLVECK.
NELSON E. BRIGHAM.